United States Patent [19]

Deal et al.

[11] Patent Number: 5,201,894
[45] Date of Patent: Apr. 13, 1993

[54] BALANCED FORCE WORKPIECE LOCATION MEANS

[75] Inventors: James L. Deal, Amston; Joseph A. Gosselin; John J. Kolesnik, both of Southington, all of Conn.

[73] Assignee: United Technologies Corporation, Hartford, Conn.

[21] Appl. No.: 858,920

[22] Filed: Mar. 27, 1992

[51] Int. Cl.⁵ .......................................... B23K 20/12
[52] U.S. Cl. ............................. 228/2; 269/23; 269/26
[58] Field of Search ................ 228/2; 279/4.02, 4.11, 279/4.07, 4.12, 4.06; 269/23, 26

[56] References Cited

U.S. PATENT DOCUMENTS

| | | | |
|---|---|---|---|
| 2,338,603 | 1/1944 | Schultz | 269/26 X |
| 3,151,871 | 10/1964 | Multer | 279/4.11 |
| 3,176,590 | 4/1965 | Uhtenwoldt | 279/4.06 |
| 3,234,644 | 2/1966 | Hollander | 29/470.3 |
| 3,235,162 | 2/1966 | Hollander | 29/470.3 |
| 3,462,826 | 8/1969 | Farmer et al. | 29/470.3 |
| 3,591,068 | 7/1971 | Farmer et al. | 228/2 |
| 4,033,569 | 7/1977 | Dunn | 269/26 |
| 4,365,136 | 12/1982 | Gottlieb | 219/121 |
| 4,669,161 | 6/1987 | Sekelsky | 269/23 |

FOREIGN PATENT DOCUMENTS 1294538  3/1987  U.S.S.R. .................................. 228/2

Primary Examiner—Kenneth J. Ramsey
Attorney, Agent, or Firm—Charles E. Sohl

[57] ABSTRACT

A workpiece location and support means as described which is free from any tendency to locate the workpiece in a predetermined position. The workpiece is supported and located by a series of hydraulic actuators which in one condition permit the workpiece to move freely but in another hydraulic condition lock the workpiece in one place and do not permit motion thereof. The present invention has particular application as a workpiece support in inertia bonding machines.

3 Claims, 6 Drawing Sheets

BALANCED FORCE WORKPIECE LOCATION MEANS

TECHNICAL FIELD

This invention relates to the positive location of workpieces and other articles.

In one embodiment, this invention relates to the location and support of a workpiece prior to an inertia bonding operation.

BACKGROUND ART

There are a large number of techniques and apparatuses suited for positively locating an article and fixing the article in a particular position. In the general area of the machining, fabricating and welding of metals, there are a vast number of chucking, clamping and fixturing devices which are employed to locate and restrain a workpiece while various operations are performed.

These prior methods and apparatus include the vises, clamps, chucks and other similar embodiments and extend in complexity to the complex fixtures which are used to locate complex articles such as automobile engine components as successive machining and finishing operations are performed.

This invention was developed to solve a problem encountered in the inertia welding of large superalloy and titanium alloy disks to form a gas turbine engine structure known as a drum rotor. However, the invention is not limited to such applications.

The inertia welding process is by now a well known, well developed process described, for example, in U.S. Pat. Nos. 3,234,644, 3,235,162, 3,462,826, 3,591,068 and 4,365,136. The essence of an inertia welding process as it might be employed to bond two disks together is to hold one disk stationary, while rotating the other disk (usually with an attached flywheel). The rotating disk is forced against the stationary disk. The resultant frictional heat (resulting from the conversion of the kinetic energy to thermal energy) causes melting of the disks at the area where contact occurs. During the welding step, and especially at the end of the welding step, substantial axial pressure is applied to force the components together.

In the bonding of drum rotor disks made of nickel superalloys, where the bond area is about twenty square inches as much as 1,000,000 pounds of axial force is applied and the kinetic energy which is converted to heat is as much as 750,000 pound feet.

In the fabrication of a drum rotor, as many as eight or ten disks may be successively bonded together. A problem is encountered in such an operation in that the errors resulting from inertia welding machine misalignment, and deflection during bonding can combine to provide a finished article in which the axies of successive disks are not coincident. In a conventional inertia bonding machine, these errors are additive with the addition of each successive disk and in an 6 to 8 disk drum rotor the cumulative errors can be unacceptable.

In order to overcome this difficulty it was desired to have a workpiece locating system which could, in one condition, permit the workpiece to move laterally in a plane as much as plus or minus thirty thousandths of an inch. In another condition, the system fixedly locates the workpiece in the plane and relative to the inertia welding machine frame.

DISCLOSURE OF INVENTION

One object of the present invention is an improved means for locating and supporting a workpiece. The invention locating means does not center or otherwise locate the part in a predetermined position.

Another object of the invention is the provision of an improved workpiece holder and intermediate support for use in an inertia bonding machine.

According to the invention, the workpiece is held in a plane by the action of opposing forces developed by fluid actuators. In one simplified form of the invention, the workpiece moves in a plane in the X and Y directions and is held between two pairs of hydraulic cylinders; one pair acting in X direction and one pair acting in the Y direction. The pair of hydraulic cylinders in the X directions is interconnected so as to provide controllable flow of fluid as is the pair of hydraulic cylinders located in the Y direction. This interconnection permits the free flow of hydraulic fluid between the cylinders when valves are opened. When free flow is permitted, the workpiece can be readily moved in the plane without significant restraint by the hydraulic cylinders. When the interconnection between the pairs of cylinders is broken, as for example, by closing the valves, the workpiece is firmly fixed in place. Proper mechanical design permits the fabrication of a system according to the present invention which can be used in inertia welding machines in which the kinetic energy of the flywheel is as much as 15,000,000 pound feet and the total axial force applied between the workpieces is as much as one million pounds.

An important feature of the invention apparatus is that it has no self-centering tendencies. In most systems which are employed to locate and retain articles, there is a bias designed into the system which tends to put each article in the same relative location. Thus, for example, a drill chuck commonly used in drill presses and hand drills tends to locate each drill exactly (in theory) in line with the axis of rotation of the drive system. The present invention, however, does not produce this result since the article can lie in the X Y plane anywhere within the limits of travel of the hydraulic actuators and it will be stable in that location when the connecting hydraulic circuits are interrupted.

FIGS. 1A, 1B, 1C and 1D illustrate the force relationships required for the successful implementation of the present invention. FIG. 1A illustrates a workpiece WP under the influence of four equal and opposed forces shown as arrows. In this condition force F1 and force F4 are balanced and force F2 and force F3 are balanced and the workpiece is positively located without any unbalanced force which would cause motion or any force couple which would tend to cause rotation. FIG. 1B, illustrates an undesirable case, a case which is outside of the scope of the present invention, in which a couple is present which tends to cause rotation. In FIG. 1B, force F2' and F3' exert equal and opposite forces on the workpiece and do not tend to cause any displacement or rotation. However, forces F1' and F4' while they are equal in magnitude, do not act along a common axis and consequently produce a couple which tends to cause rotation. Viewed in another way, force F1' and force F2' can be added in a vector sense to produce resultant force $F_a$ whereas force F3' and F4' can be added to produce resultant force $F_b$. Resultant forces $F_a$ and $F_b$ do not act along a common axis and consequently produce a force couple which would tend to cause rotation. FIG. 1C illustrates that the forces applied to the workpiece do not need to act along common axes in order for a stable workpiece relationship to occur free from any tendency rotation. In FIG. 1C, force F1" and force F4" are equal in magnitude but do not act on a common axis and consequently produce a force couple which would tend to cause the workpiece to rotate in a counter-clockwise fashion. Forces F2" and F3" likewise are equal in magnitude but displaced one from another and consequently cause a couple which would tend to rotate the workpiece in the clockwise direction. In the FIG. 1C condition, two couples are equal and opposite in magnitude and tend to cancel each other out. This can be viewed from another perspective not noting the vector summation of force F1" and F3" is resultant force Fc and the vector summation of F2" and F4" is resultant force Fd and resultant forces Fc and Fd act on a common axis and consequently result in a part in equilibrium which will not rotate. FIG. 1D is presented to illustrate that the forces do not need to be diametrically opposed about the periphery of the part and in fact that an odd number of forces F1''', F2''' and F3''' can be employed to clamp a workpiece in a stable configuration with no tendency for translation or rotation.

FIG. 2 takes the force schematic of FIG. 1A and illustrates how it can be used to accomplish the objective of the present invention, namely the fixed, stable location of a workpiece and means by which the exact location of the workpiece can be slightly varied to provide desired results and in which the workpiece locations means does not have any self-centering characteristics.

In FIG. 2 the workpiece WP is under the action of four hydraulic cylinders or actuators A. The actuators are evenly located about the periphery of the part and opposite pairs of actuators are connected together in a hydraulic circuit. Each hydraulic circuit contains valve V in the circuit and the circuit is pressurized by pump P which draws fluid from fluid reservoir R. The invention can be entirely understood by reference to FIG. 2. In FIG. 2 it will be appreciated that when the valve V are open they permit the free flow of hydraulic fluid between actuators A and the workpiece WP can be moved in the X-Y plane freely and without constraint. But when valves V1, V2 are closed part movement in the X - Y plane is restrained.

Other features and advantages will be apparent from the specification and claims and from the accompanying drawings which illustrate an embodiment of the invention.

BEST MODE FOR CARRYING OUT THE INVENTION

The invention will be described as designed for use with a inertia bonding machine having an axial thrust capacity of one million pounds, a diameter capacity of about 36 inches and a kinetic energy maximum of about 750,000 pound feet.

Figure 1A:
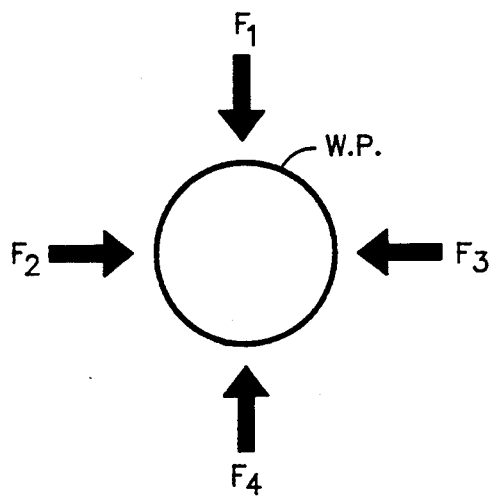
FIGS. 1A, 1B, 1C and 1D illustrate the force relationships required to accomplish the objective of the present invention.
Figure 1B:
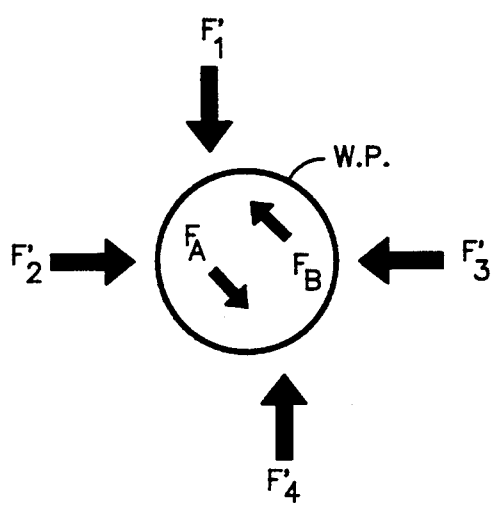
Figure 1C:
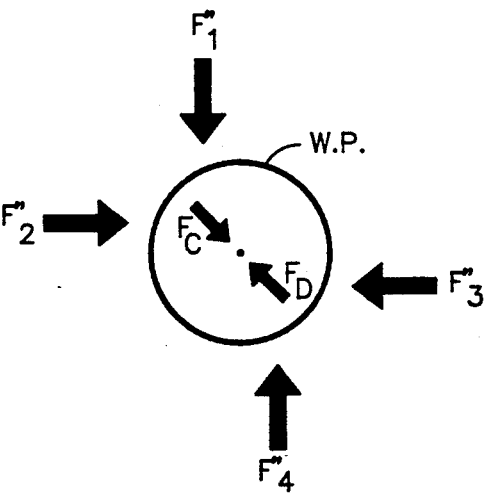
Figure 1D:
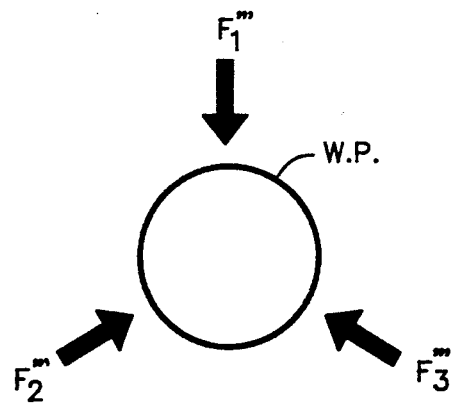
Figures 2, 3:
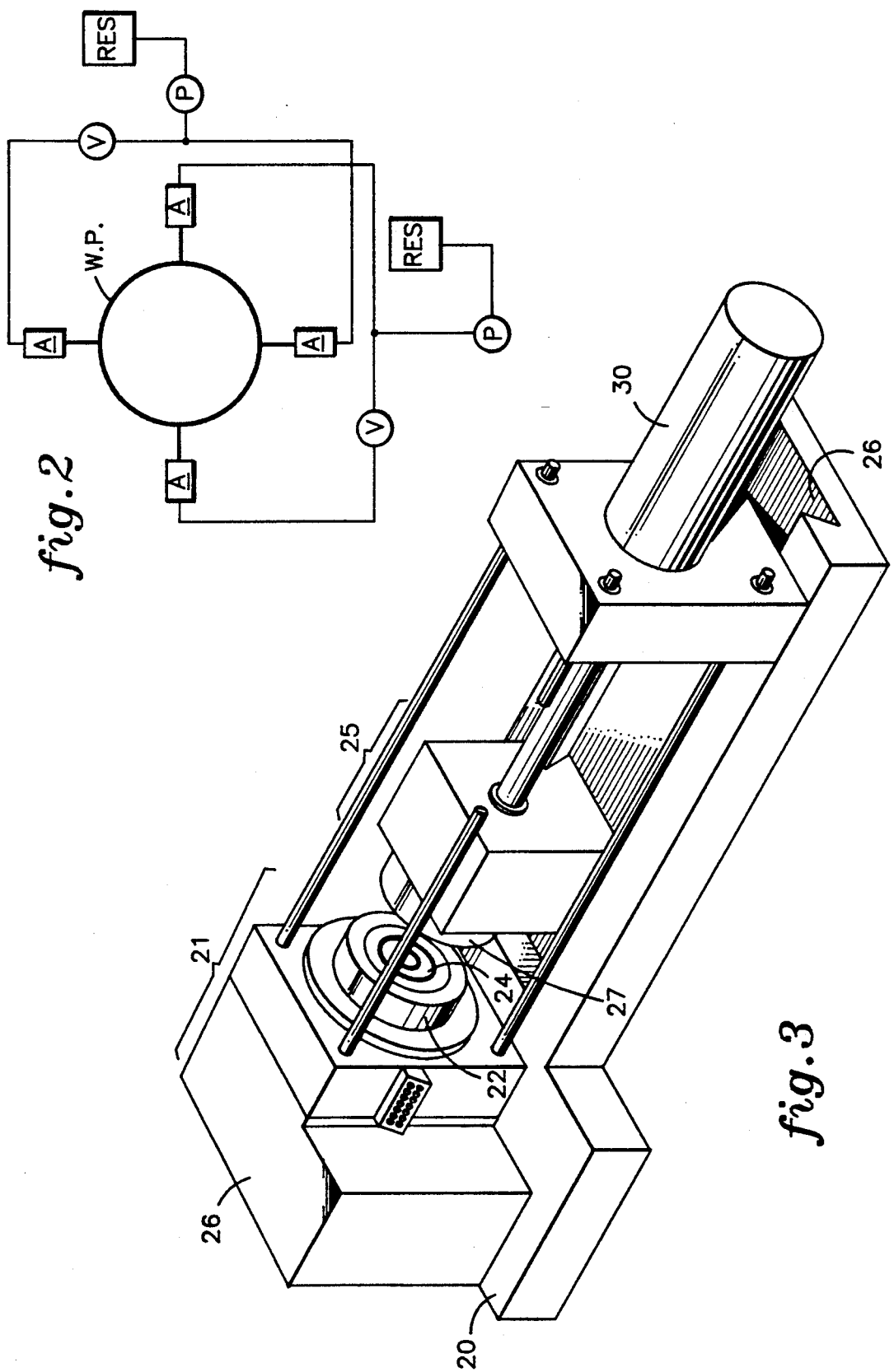
FIG. 2 illustrates a hydraulic scheme for accomplishing the objective of the invention.
FIG. 3 illustrates the basic elements of an inertia bonding machine with which the present invention is adapted to be used.

Such a machine is shown schematically in FIG. 3. The machine includes base member 20 upon which is mounted a headstock assembly 21 and a drive assembly which is contained in housing 26. The headstock assembly includes workpiece holder 22 which is adapted to mount workpiece 24 and to controllably rotate workpiece 24 under the influence of the drive assembly. Tailstock assembly 25 is mounted on base assembly 20 and slides within a groove 26. Tailstock 25 includes a workpiece housing 27 which contains a workpiece, not shown. Tailstock assembly 25 is adapted to be forced along groove 26 by motive means 30 which may, for example, be a hydraulic cylinder. The workpiece mounted in workpiece holder 27 is the stationary workpiece and does not rotate but merely translates axially towards the spinning workpiece 24. In operation, the spinning workpiece 24 is part of a rotating system which contains considerable kinetic energy and may include flywheel means to store such energy. When the stationary workpiece is thrust against the rotating workpiece 24, friction slows and eventually stops workpiece 24 from spinning. During its frictional process the kinetic energy contained in the spinning workpiece holder assembly 24, 22 is converted to thermal energy, sufficient thermal energy cause localized surface melting and bonding of the workpieces under the action of the axial force developed by the axial force means 30.

Figure 4:
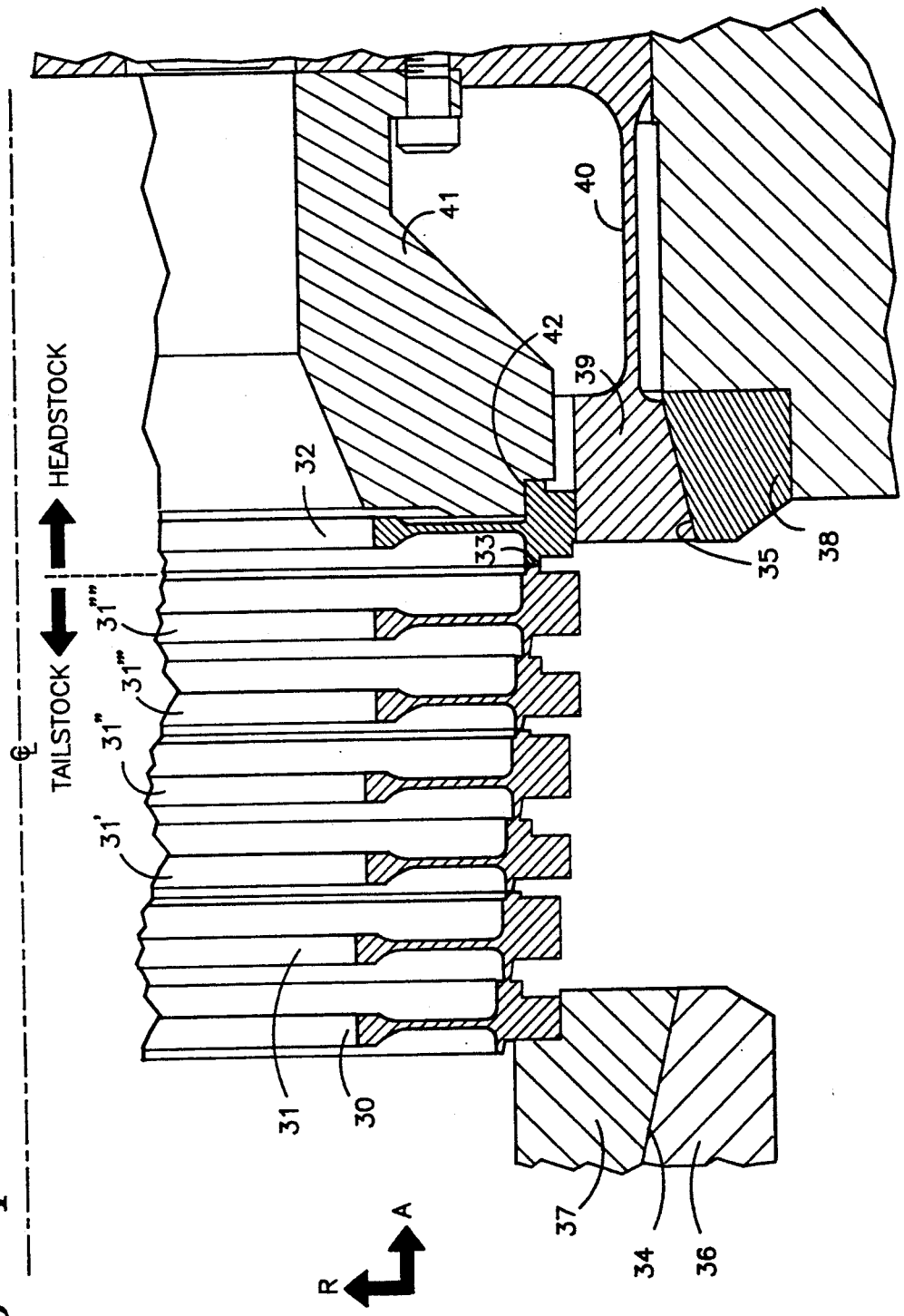
FIG. 4 illustrates the prior art clamping scheme for inertia bonding of disks.

FIG. 4 shows a typical prior art method of gripping and supporting the disks to be bonded. In FIG. 4, the intended bond line is designated with the numeral 3. Drawing details to the left of bond plane 33 are in the tailstock of the inertia bonder. Drawing details to the right of bond plane 33 are in the headstock of the inertia bonder. The tailstock includes clamping means including elements 38 and 39 which makes up a tapered collet with the taper surface being designated by the numeral 35. In use, when an axial force is developed it causes relative motion along surface 34 thereby generating a radial clamping force on the disk 30. The clamping collet assembly comprised of articles 37, 38 clamps the previously bonded disks and holds the previously bonded disks stationary. In the headstock portion, a similar clamping collet arrangement comprised of elements 38 and 39 which interact along bond plane 35 is used to develop a clamping force on disk 32. Alignment and location problems arise in part because of the high forces used in the inertia bonding process. Machine deflection must always be a concern. As the number of previously bonded disks grows, the possibility and likelihood of undesirable workpiece deflection increases. In addition, there are always unpredictable distortions and variations in the machine itself due to operating conditions including temperature, etc. To the extent that there is misalignment between the previously bonded disk assembly and the disk to be bonded, such errors tends to be cumulative. Thus, when bonding two disks together, their center lines may be displaced from 3 to 5 mills. It is inevitably found, however, that upon bonding of subsequent disks to these previously bonded disks, this 3 to 5 mill error continues on each successive disk so that after 6 or 8 disks are bonded, the cumulative error may be as much as 40 mils. This is an unacceptable error since the pieces are already in a final machined condition.

Despite the most painstaking effort to align the workpieces prior to bonding, these cumulative errors are inevitably encountered. Prior art clamping systems inevitably have been of the so-called self-centering type so that an effort to add further clamping means to support and locate disk 31'''', in FIG. 4, the disk to be bonded to disk 32 in the , has been unsuccessful because of the self-centering tendencies of the prior art clamping schemes. When the self-centering schemes force the previously bonded disk assembly to assume a particular position into bonding, this accentuates the bonding errors which were previously mentioned since upon release of any clamping mechanism after bonding, the (now bonded) part assumes its prior shape.

A part of the present invention was the careful observation of prior art inertia bonding machines and the realization that the errors were due to this undesirable part deflection and that what was needed was a support scheme which would provide rigid support without any element of self-centering action.

Figure 5:
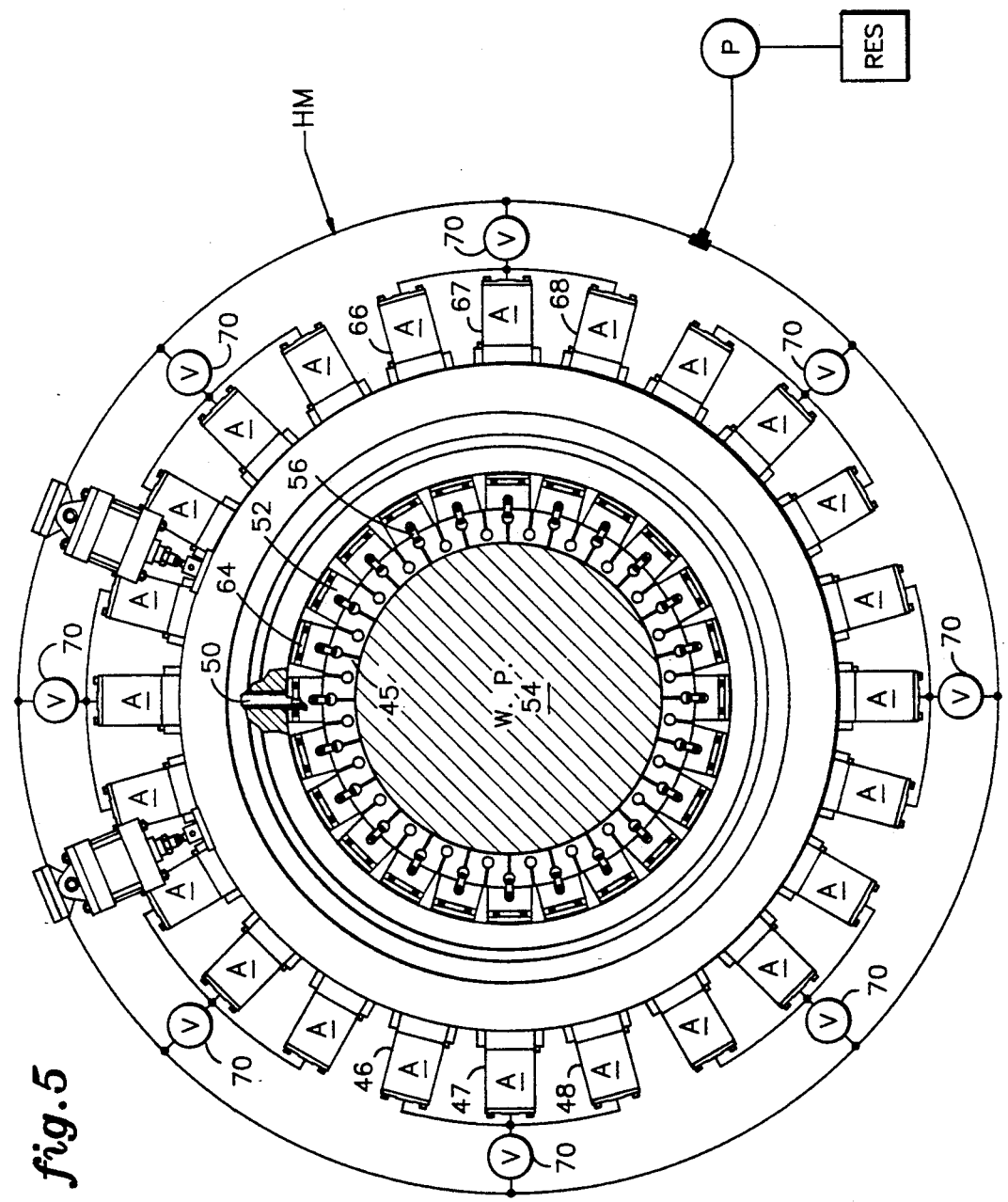
FIG. 5 is a view down the axis of rotation disks being bonded showing the arrangement of hydraulic actuators of the interconnection between these actuators and workpiece.

FIG. 5 shows an axial view of a workpiece holder according to the present invention. Referring now to FIG. 5, the holder includes 24 hydraulic actuators A evenly located about the circumference of the workpiece holder. Each cylinder has an actuator rod 50 which is adapted to apply an inward force in a radial direction. The direction of force application of opposite pairs of cylinders in this embodiment are coaxial. The hydraulic actuators each apply force through a rod 50 to a spring ring 45 which in turn contacts the workpiece (not shown).

Spring ring 45 is a desirable feature of the present invention though not required for all applications. Spring ring 45 is a metal ring having an inside diameter and an outside diameter and a plurality of slots which extend from one cylindrical surface towards the other cylindrical surface but do not extend completely through the ring. The slots extend alternately from the inside surface towards the outside diameter and from the outside surface toward the inside surface. Each slot is terminated by a hole which is present to prevent crack initiation or propagation. The geometry of the slot and hole combinations in the spring ring is termed a keyhole slot. Generally speaking, each slot extends from about 60 to about 90% through the thickness of the ring and the hole diameter at the end of each slot ranges from at least 4 times the nominal slot width up to about 25% of the radial ring thickness. The size and spacing of the terminal hole is such that a continuous web of metal separates the hole from the nearest cylindrical surface and the thickness of this web is not less than about 0.030 inches. The nominal width of the slot ranges from about 0.010 inches to about 0.030 inches. The cumulative effect of these numerous slots is to permit expansion and flexibility of the spring ring in the circumferential direction. However, because the slots are radially oriented, the spring ring cannot change its radial thickness. Thus, the spring ring can expand or contract slightly to exactly accommodate the workpiece diameter which may have tolerances of plus or minus 0.005 inches. However, when force is applied in the radial direction, the spring ring has no compliance and directly transmits all force in the radial direction.

Figure 6:
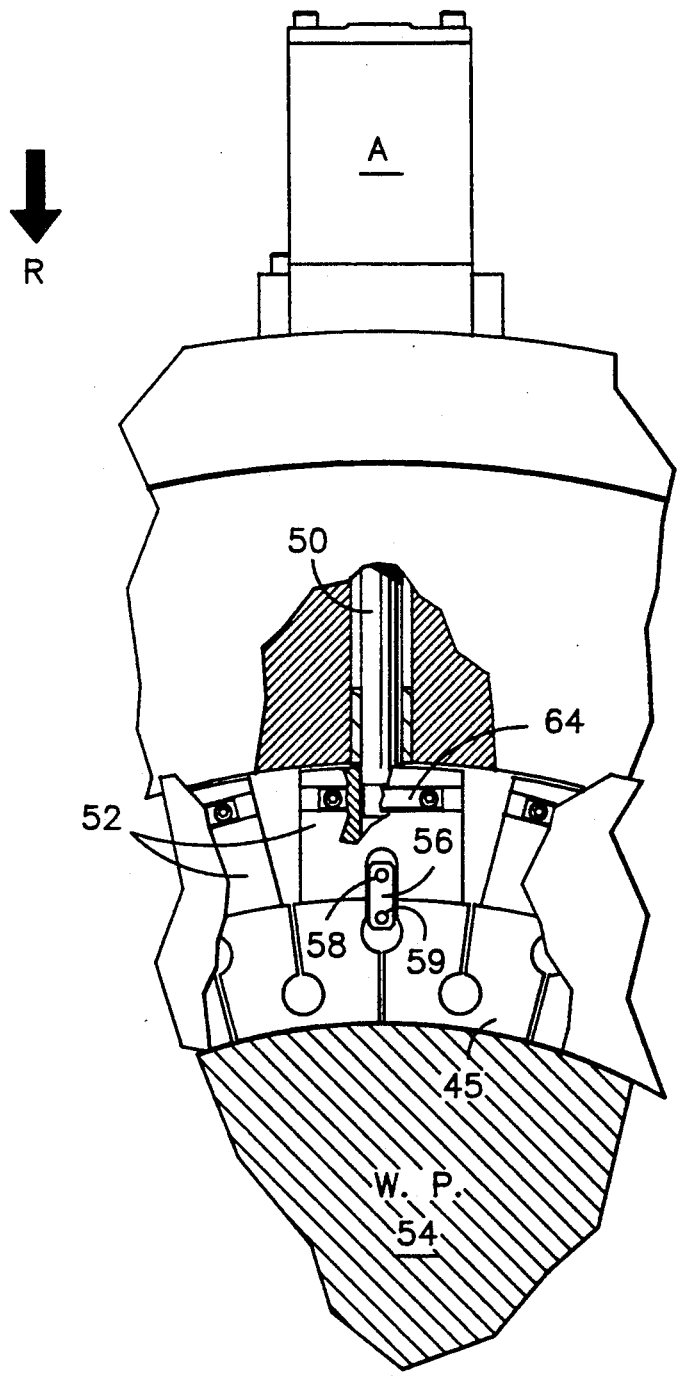
FIG. 6 is a view down the axis of the bonding machine showing the details of the linkage between the hydraulic actuators and the workpiece.

The details of the hydraulic interconnection and the interaction between the actuator, the spring ring and the workpiece are shown in more detail in FIG. 6. In the embodiment shown in FIG. 5, adjacent actuators, in groups of three, are connected in parallel and then a single connection connects that group of three with a hydraulic manifold HM. For example, actuators 46, 47 and 48 are connected together and a single connecting hose connects hydraulic actuators 46, 47 and 48 hydraulic manifold HM. Thus, there are eight groups of three hydraulic actuators, each group having interconnecting lines containing a valve V-70. These valves are adapted for operation by remote control, e.g., by electric or hydraulic operation.

Figure 7:
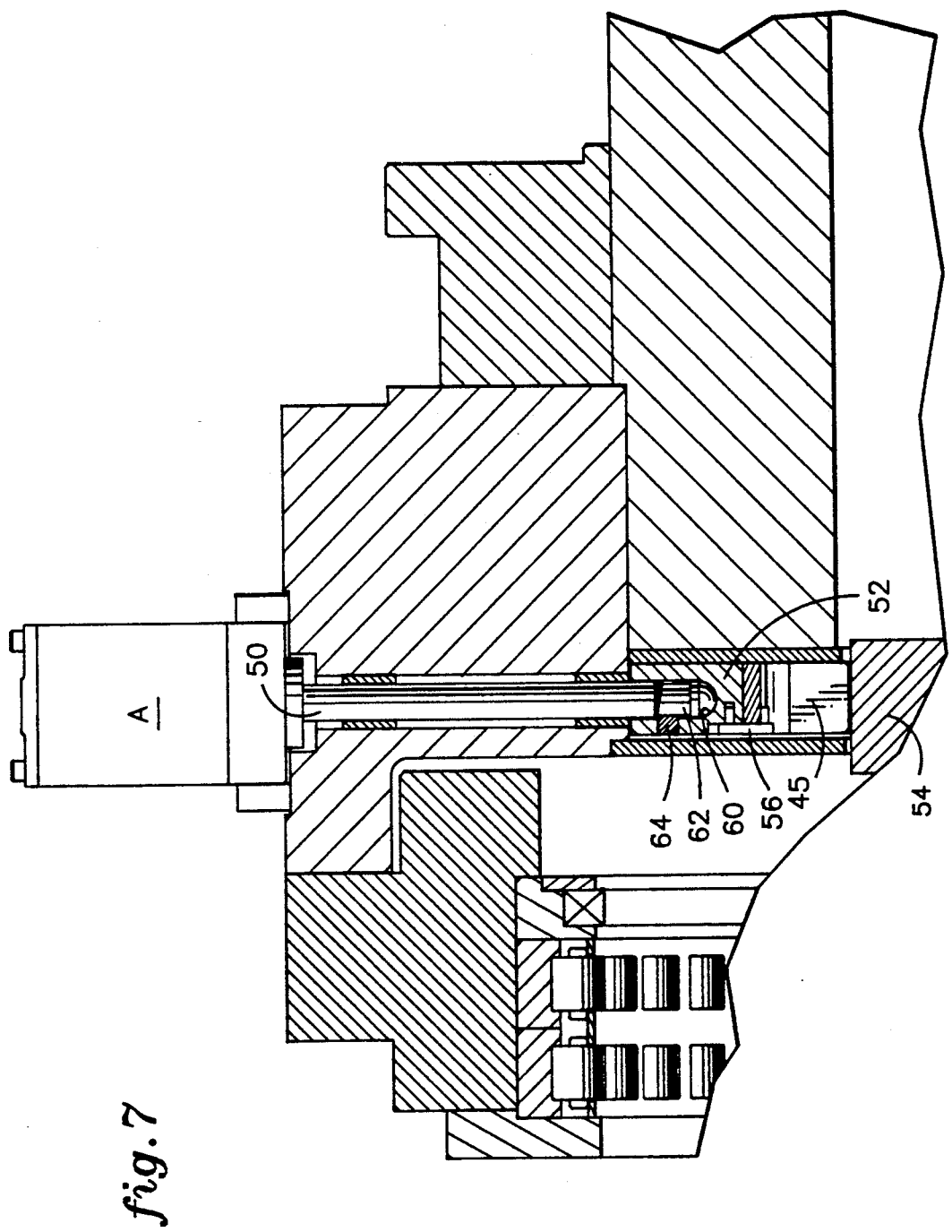
FIG. 7 is a longitudinal view showing the details of the interconnection between the hydraulic actuators and the workpiece.

By way of background, the typical disk diameter which is to be joined in the machines for which this workpiece holder was designed, ranges from about 25 to 35 inches. The hydraulic cylinders have a piston area of about 7.8 square inch in each actuator and a hydraulic pressure of about 980 psi can be employed to cause the hydraulic actuators A to move the spring ring 45 into continuous intimate contact with workpiece 54. In the machines with which we have worked, the degree of workpiece motion required in the workpiece support system is usually less than about 0.030 and often less than 0.010. Turning now to FIG. 6 and 7, these Figs. illustrate the interconnection between the actuator and the workpiece in the FIG. 5 example. It will be appreciated that workpieces of other than exactly round geometries can easily be gripped in a workpiece holder according to the present invention. It will also be appreciated that more or less than 24 actuators and interconnecting circuits can be employed according to the specific problem at hand and specific workpiece geometry to be gripped. It will also be appreciated that in certain circumstances the spring ring 45, in FIGS. 5, 6 and 7, need not be present. One reason we use spring rings is that we use different size spring rings to adapt different size disks to a single size workpiece support system.

Now with particular respect to FIG. 6, the actuator A contains a hydraulic cylinder piston (not shown) which provides a force in the radial or R direction along and through rod 50. Rod 50 terminates in shoe 52 which bears on spring ring 45. Thus, when hydraulic force is generated within actuator 40, the rod pushes on shoe 52 which pushes radially on spring ring 45 which in turn acts on workpiece 54. FIG. 6 shows a radial view of the actuator assembly and its inter relationship with the spring ring in the workpiece and FIG. 7 shows a radial view of a similar actuator.

As shown in FIG. 7, the actuator A produces force in rod 50. Rod 50 has a hemispherical end 60 which rests in a hemispherical bottomed hole in shoe 52. Rod 50 has a stepped portion 62 of reduced diameter and a retainer 64 fits in a recess in block 52 and is attached thereto, and bears on the reduced diameter 62 of rod 50, causing rod 50 to pull shoe 52 away from workpiece 54 when actuator A retracts. Also, as shown in FIG. 6, block 52 is connected to spring ring 45 by link 56 through which pass pins 58 and 59. Thus, when hydraulic actuator 40 withdraws rod 50, a tensile force will be transmitted from rod 50 through retainer 64 to block 52 and then through link 56 to withdraw spring ring 45 slightly, thereby permitting the easy motion of the workpiece relative to the spring ring after the performance of the bonding operation.

It should be understood that the invention is not limited to the particular embodiments shown and described herein, but that various changes and modifications may be made without departing from the spirit and scope of this novel concept as defined by the following claims.

What is claimed is:

1. A non-centering workpiece holder and support comprising:
   fluid activated means for generating a plurality of forces directed into the workpiece;
   said plurality of forces, when added in a vector sense producing no net force couple on said workpiece;
   said plurality of fluid activated means being interconnected by fluid passageways containing valves so that workpiece motion can occur when said valves are open and fluid can move between said fluid activated means, but workpiece motion is inhibited when said valves are closed to prevent the motion of fluid between said fluid activated means.

2. A stationary workpiece holder and support system for holding and locating a stationary workpiece which comprises:
   a plurality of hydraulic actuators adapted to generate forces on the surface of a spring ring which surrounds the workpiece, said forces being essentially perpendicular to said workpiece surface, said forces being balanced and producing no net force or couple on said workpiece when said activators are energized by the application of hydraulic pressure and wherein said spring ring has an ID which substantially conforms to the workpiece OD, said spring ring comprises a metal ring having a series of keyholes therein, and said key holes extend axially with respect to the ring axis of symmetry and comprise a cylindrical hold connected to a slot wherein said hole has a diameter which is at least four times the slot width but less than 50% of the radial thickness of the ring, said hole being drilled closer to either diametrical ring surface than to the other and being connected with the further diametrical ring surface by said slot wherein the slots alternately connect with the ID and OD diametrical surface, whereby said spring ring is capable of circumferential expansion and contraction and essentially incapable of expansion or contraction in the radial thickness dimension.

3. In rotary inertia bonding apparatus of the type used to bond metallic articles together across a bond plane using frictionally produced melting and an applied force between the articles, said applied force being applied substantially perpendicular to the bond plane, and including a headstock and means to rotate one workpiece mounted in said headstock and a tailstock and means to hold the other workpiece stationary in said tailstock, the improvement which comprises a noncentering workpiece holder and support means to hold and support the stationary workpiece at a point on the stationary workpiece immediately adjacent the intended bond plane.

* * * * *